(12) United States Patent
Picon et al.

(10) Patent No.: US 10,478,654 B2
(45) Date of Patent: Nov. 19, 2019

(54) JUMP ROPE WITH QUICK-ADJUST HANDLE

(71) Applicants: Jesus Miguel Silva Picon, Navarra (ES); Pablo Silva Picon, Navarra (ES)

(72) Inventors: Jesus Miguel Silva Picon, Navarra (ES); Pablo Silva Picon, Navarra (ES)

( * ) Notice: Subject to any disclaimer, the term of this patent is extended or adjusted under 35 U.S.C. 154(b) by 59 days.

(21) Appl. No.: 15/884,283

(22) Filed: Jan. 30, 2018

(65) Prior Publication Data

US 2019/0224517 A1    Jul. 25, 2019

(30) Foreign Application Priority Data

Jan. 20, 2018 (EM) .................................. 18382029

(51) Int. Cl.
 *A63B 5/20* (2006.01)
(52) U.S. Cl.
 CPC ...................................... *A63B 5/20* (2013.01)

(58) Field of Classification Search
 CPC .... A63B 5/00; A63B 5/20–22; A63B 21/0557
 See application file for complete search history.

(56) References Cited

U.S. PATENT DOCUMENTS

2018/0361187 A1* 12/2018 Hopkins .................. A63B 5/20

\* cited by examiner

*Primary Examiner* — Jennifer M Deichl
(74) *Attorney, Agent, or Firm* — John Alumit

(57) ABSTRACT

A jump rope with a quick-adjust handle having an elongated handhold, a head, adapted to be coupled to one of the ends of the rope, which is attached by one of its ends to one of the ends of the handhold, a cylindrical push button, a grub screw and a spring. The cylindrical push button has on its cylindrical surface a first through-hole for the passage of the rope and a recess, offset 90°, and the head has at its free end a cylindrical hole, whose axis coincides with the revolution axis of the head, and which is adapted to house the push button and the spring in its interior, and, said head, has on its revolution surface a through-hole for the passage of the cable and a threaded hole, to screw the grub screw, offset 90°.

2 Claims, 2 Drawing Sheets

JUMP ROPE WITH QUICK-ADJUST HANDLE

CROSS-REFERENCE TO RELATED APPLICATION

This application is a national patent application that claims priority to European Patent Application no. 18382029.9 filed on Jan. 20, 2018. The earliest priority date claimed is Jan. 20, 2018.

FEDERALLY SPONSORED RESEARCH

None

SEQUENCE LISTING OR PROGRAM

None

BACKGROUND

Jump rope (comba) is a word that in Spanish has two meanings. The first one is the physical exercise or children's game that consists of jumping over a rope that is passed under the feet and over the head of the person who jumps. The second one is the rope that is used in said exercise or game.

The practice of rope jumping is a physical exercise that optimizes cardiovascular performance and aerobic capacity. It involves all the muscles of the body, improves coordination between legs and arms, increases agility and speed, and eliminates stress. It is an ideal tool for starting high-performance workouts.

The jump rope is a rope, with both ends having handles to facilitate its handling. The union between the handles and the ends of the rope is usually permanent, that is, the handles of the jump rope cannot be separated without breaking the handles or the rope. This is a drawback because the rubbing of the rope with the floor wears it, and the rope can even break. One cannot replace the rope alone, but has to buy a new jump rope.

The object of the present invention is a novel jump rope that comprises two handles at the ends of the rope, which allow quick and easy coupling of the rope to them.

SUMMARY

The present invention provides a novel jump rope with has handles that allow a user to replace the rope in an easy and fast way by simply pressing a push button.

The jump rope with quick-adjust handle includes a rope and two handles attached to the ends of the rope, each of the handles comprises a handhold, a head, which is attached to said handhold and which has means of attachment, operable at will, to one of the ends of the rope, and a device for fixing the attachment means to the aforementioned head.

DRAWINGS

Figure 1:
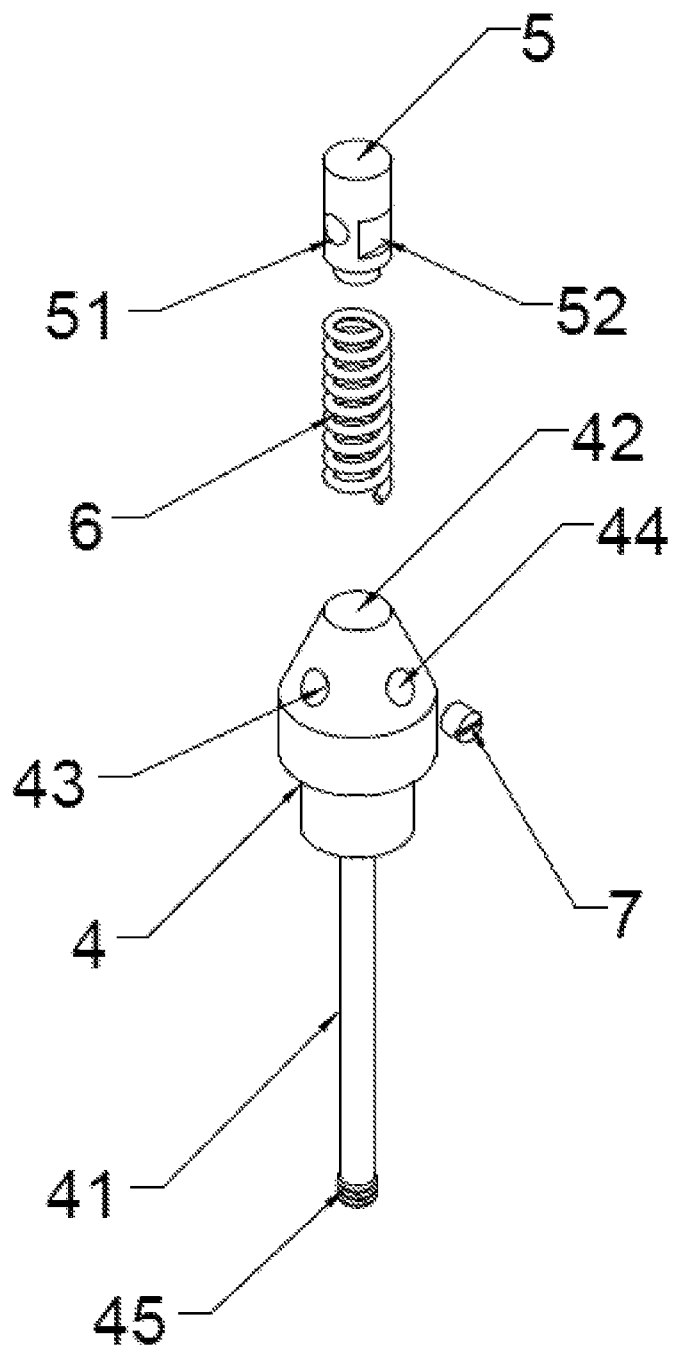

FIG. 1: shows a perspective view of an exploded head, the means of attachment and of the fixing device, of the jump rope with quick-adjust handle.

Figure 2:
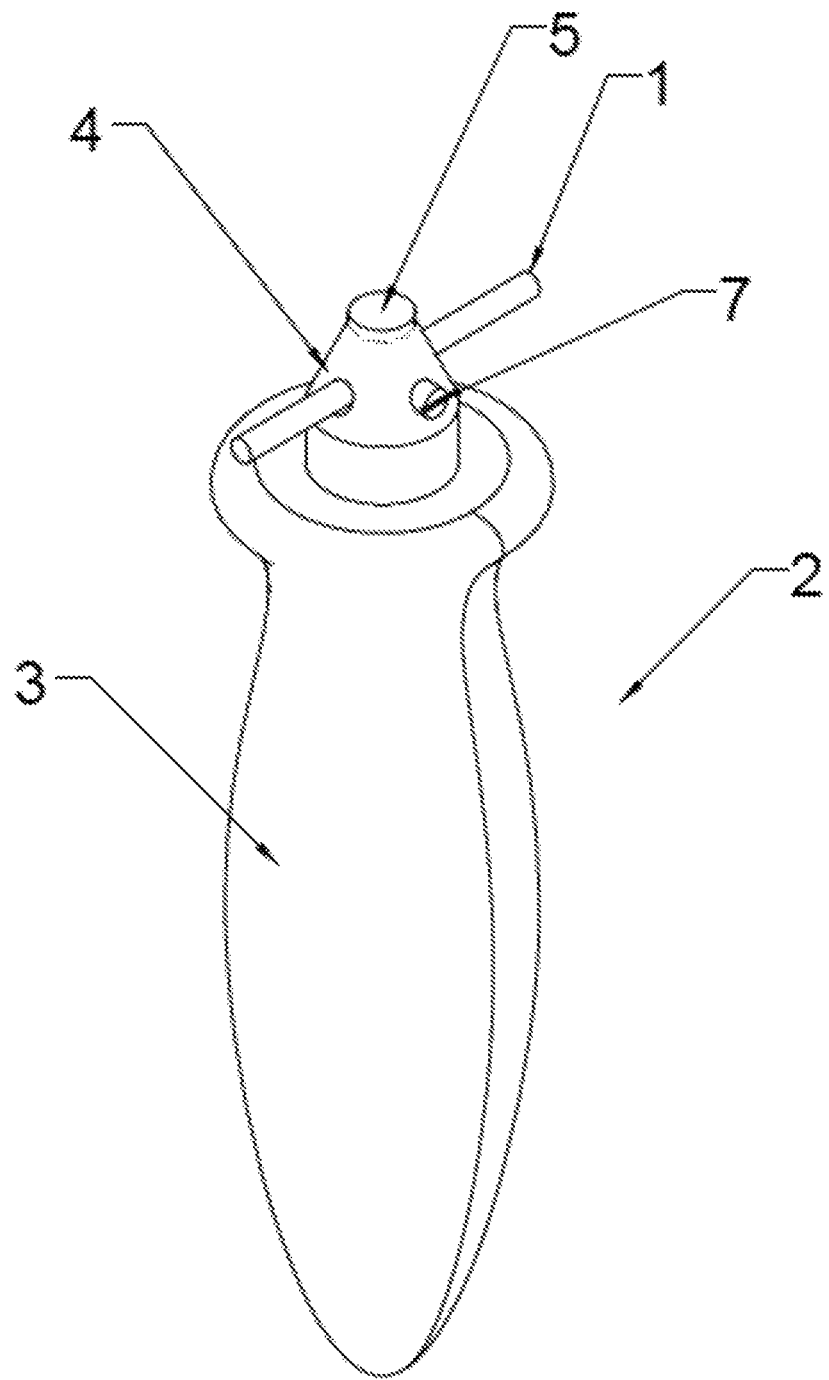

FIG. 2: shows a perspective view of a handle with one end of the rope coupled to it.

DESCRIPTION

FIGS. 1 and 2 show a preferred embodiment of the jump rope with quick-adjust handle, which is the object of the present description, and which is a jump rope comprising a rope (1), cable or similar element, and handles (2) attached to its ends. Each of the handles (2) comprises a handhold (3), which can be elongated, and which can be made of wood, plastic materials or it can be made of two materials, for example, plastic and rubber, a head (4), which has attachment means, operable at will, to one of the ends of the rope and a device for fixing the attachment means to said head.

In the preferred embodiment shown in FIGS. 1 and 2, the head (4) has the shape of a revolution body, for example, a cylinder with a conical end and a circular recess at its other end, and is joined by one of its ends to the handhold (3). Said head has at its other end a cylindrical hole (42), where the attachment means are housed.

The attachment means comprise: a first through-hole (43) for the passage of the rope (1) arranged on the revolution surface of the head (4), a cylindrical push button (5), which has on its cylindrical surface a second through-hole (51) for the passage of the rope and a spring (6) placed between the bottom of the cylindrical hole (42) and the push button, which exerts a pressure on said cylindrical push button (5).

The fixing device, for the means of attachment to the head, comprises: a threaded hole arranged on the revolution surface of the head and which is offset 90° with respect to the first through-hole, a recess arranged on the cylindrical surface of the push button, the length of which is smaller than the length of said push-button and that it is offset 90° with respect to the second through-hole, and a grub screw (7) intended to be introduced in said threaded hole and the tip of which is intended to butt with the upper and lower edges of said recess.

The head (4) can be linked to one of the ends of the handhold (3), for example, by means of a rod (41), whose upper end is attached to the end of the head (4) opposite the end that has a cylindrical hole, and that at its lower end has a plurality of circular protrusions (45). Said rod is inserted in the handhold and the protrusions serve for its fixation.

For any person, and especially for one skilled in the art, the description and the figures that accompany it are sufficient to know how to assemble and use the present invention, although its assembly and function are briefly described below. For assembly, the spring (6) is first inserted and then the push button (6) is inserted in the cylindrical hole (42), the push button is pushed towards the bottom of the cylindrical hole and, if necessary, the push button is turned until the through-holes of the head and the push button (43 and (51) coincide, and then, the grub screw (7) is screwed in the threaded hole (44) of the head until it is inserted in the recess (52), what prevents the push button from leaving the cylindrical hole due to the pressure exerted by the spring. To insert a rope, cable or similar element in the head, it is enough to press the push button until its through-hole (51) coincides with the through-hole (43) of the head and to insert the rope, when releasing this push button, due to the pressure exerted by the spring, tends to leave the cylindrical hole and the rope is fixed. To uncouple the rope you only need to press the push button and pull the rope.

What is claimed:

1. A Jump rope with quick-adjust handle, the jump rope comprising a rope (1) and two handles (2) attached to ends of the rope (1), wherein each of the handles (2) comprises: a handhold (3), a head (4), which is attached to said handhold and which has attachment means, operable at will, to one of the ends of the rope, and a device for fixing the attachment means to said head;

wherein the head (4) has the form of an elongated revolution body, is attached by one of its ends to the handhold, and at its other end the head has a cylindrical hole (42) with an axis that coincides with a revolution axis of the head and which is adapted to house the attachment means in its interior; and wherein the attachment means comprise: a first through-hole (43) for the passage of the rope (1) arranged on the revolution surface of the head (4), a cylindrical push button (5), which has on its cylindrical surface a second through-hole (51) for the passage of the rope and a spring (6) placed between a bottom of the cylindrical hole (42) and the push button, which exerts a pressure on said cylindrical push button (5); and in that the fixing device, of the attachment means to the head, comprises: a threaded hole arranged on the revolution surface of the head and which is offset 90° with respect to the first through-hole, a recess arranged on the cylindrical surface of the push button, a length of which is smaller than a length of said push-button and that it is offset 90° with respect to the second through-hole, and a grub screw (7) adapted to be introduced in said threaded hole, and the tip of which is adapted to butt with upper and lower edges of said recess.

2. The Jump rope with quick-adjust handle according to claim 1, wherein the head is attached to the handle by a rod (41), with an upper end attached to an end of the head opposite an end in which a cylindrical hole is arranged and with a lower end having a plurality of circular protrusions (54).

\* \* \* \* \*